US007128391B2

(12) United States Patent
Meadows et al.

(10) Patent No.: US 7,128,391 B2
(45) Date of Patent: Oct. 31, 2006

(54) SELF ALIGNING PRINTHEAD CARRIER BEARINGS FOR AN IMAGING APPARATUS

(75) Inventors: Robert Michael Meadows, Lexington, KY (US); Brian Andrew Naro, Bessemer, AL (US); Bryan Christopher Scharf, Richmond, KY (US); Randal Scott Williamson, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 261 days.

(21) Appl. No.: 10/880,936

(22) Filed: Jun. 30, 2004

(65) Prior Publication Data

US 2006/0001697 A1 Jan. 5, 2006

(51) Int. Cl.
*B41J 23/00* (2006.01)
*F16C 33/00* (2006.01)

(52) U.S. Cl. .................... 347/37; 400/354; 400/354.1; 400/354.2; 400/354.3

(58) Field of Classification Search ............ 347/37–39; 400/354–354.3
See application file for complete search history.

(56) References Cited

U.S. PATENT DOCUMENTS 2,478,056 A 8/1949 Reeg
2,626,841 A 1/1953 Potter
2,952,898 A 9/1960 Glavan et al.
3,254,926 A 6/1966 Hilton
3,960,256 A * 6/1976 Bickoff et al. ................ 400/59
4,222,673 A 9/1980 Plaza et al.
4,251,122 A 2/1981 McCloskey
6,164,830 A 12/2000 Nitzsche et al.
6,340,221 B1 * 1/2002 Driggers et al. .............. 347/37
6,666,599 B1 12/2003 Park
6,695,499 B1 2/2004 Bartolome et al.
2004/0022464 A1 2/2004 Schinazi et al.
2004/0022465 A1 2/2004 Fish

* cited by examiner

*Primary Examiner*—Lamson Nguyen
*Assistant Examiner*—Han Samuel Choi
(74) *Attorney, Agent, or Firm*—Taylor & Aust

(57) ABSTRACT

An imaging apparatus includes a printhead carrier configured for movement along an X-axis. The printhead carrier includes a carrier housing having a first bearing pocket and a second bearing pocket. The first bearing pocket and the second bearing pocket are spaced apart along the X-axis. A Z-axis passes through a central region of the carrier housing. The Z-axis is substantially perpendicular to the X-axis. A first bearing is configured to be received in the first bearing pocket. The first bearing includes a first curved outer surface having a curve that extends in a direction of the X-axis. The curved outer surface is received in the first bearing pocket to facilitate a rotation of the first bearing in relation to the Z-axis of the carrier housing. A second bearing is configured to be received in the second bearing pocket.

13 Claims, 5 Drawing Sheets

SELF ALIGNING PRINTHEAD CARRIER BEARINGS FOR AN IMAGING APPARATUS

BACKGROUND OF THE INVENTION

1. Field of the Invention

The present invention relates to an imaging apparatus, and, more particularly, to self aligning printhead carrier bearings for an imaging apparatus.

2. Description of the Related Art

An imaging apparatus, in the form of an ink jet printer, forms an image on a print medium by ejecting ink from a plurality of ink jetting nozzles of an ink jet printhead to form a pattern of ink dots on the print medium. Such an ink jet printer typically includes a reciprocating printhead carrier that transports one or more ink jet printheads across the print medium along a bi-directional scanning path defining a print zone of the printer. Typically, the mid-frame provides media support at or near the print zone. A sheet feeding mechanism is used to incrementally advance the print media sheet in a sheet feed direction, also commonly referred to as a sub-scan direction, through the print zone between scans in the main scan direction, or after all data intended to be printed with the print medium at a particular stationary position has been completed.

The reciprocating printhead carrier is supported, for example, by at least one guide rod. The printhead carrier may include a pair of axially spaced bearings having respective apertures for receiving the guide. One parameter that limits print quality in bi-directional printing is the carrier bearing clearance, i.e., the amount of clearance between the carrier bearings and the associated guide rod. Bearing clearance is necessary from a manufacturing tolerance perspective, and typically the tighter the tolerances the more expensive the printer. The effect of the bearing clearance is a shift in the registration position of the ink jet printhead with respect to a print area on the print media sheet.

What is needed in the art is an apparatus providing tighter bearing-to-rod clearances.

SUMMARY OF THE INVENTION

The present invention provides an apparatus providing tighter bearing-to-rod clearances.

The present invention, in one form thereof, is directed to an imaging apparatus. The imaging apparatus includes a guide rod extending along an X-axis, and a printhead carrier configured for movement along the X-axis. The printhead carrier includes a carrier housing having a first bearing pocket and a second bearing pocket. The first bearing pocket and the second bearing pocket are spaced apart along the X-axis. A Z-axis passes through a central region of the carrier housing. The Z-axis is substantially perpendicular to the X-axis. A first bearing is configured to be received in the first bearing pocket. The first bearing includes a first curved outer surface having a curve that extends in a direction of the X-axis. The curved outer surface is received in the first bearing pocket to facilitate a rotation of the first bearing in relation to the Z-axis of the carrier housing. A second bearing is configured to be received in the second bearing pocket.

The present invention, in another form thereof, is directed to an imaging apparatus. The imaging apparatus includes a printhead carrier configured for movement along an X-axis. The printhead carrier includes a carrier housing having a first bearing pocket. The first bearing pocket includes a first upper mounting feature and a first lower mounting feature. The first upper mounting feature and the first lower mounting feature are spaced apart along a first Z-axis. The first Z-axis is substantially perpendicular to the X-axis. A first bearing is configured to be received in the first bearing pocket. The first bearing has a first locating pin for engagement with the first lower mounting feature and a first mounting post for engagement with the first upper mounting feature. The first locating pin and the first mounting post are diametrically opposed along the first Z-axis. The first bearing has a first curved outer surface having a curve that extends in a direction of the X-axis and that is received in the first bearing pocket.

The present invention, in yet another form thereof, is directed to a bearing including an outer surface and an aperture with a first axis passing through the aperture. A first portion of the outer surface is curved and a second portion is flat. An extent of the curve is in a direction of the first axis.

The present invention, in still another form thereof, is directed to an apparatus. The apparatus includes a bearing that includes a locating pin, and a mounting post diametrically opposed to the locating pin.

An advantage of the present invention is that it provides for tighter bearing-to-rod clearances in an imaging apparatus.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
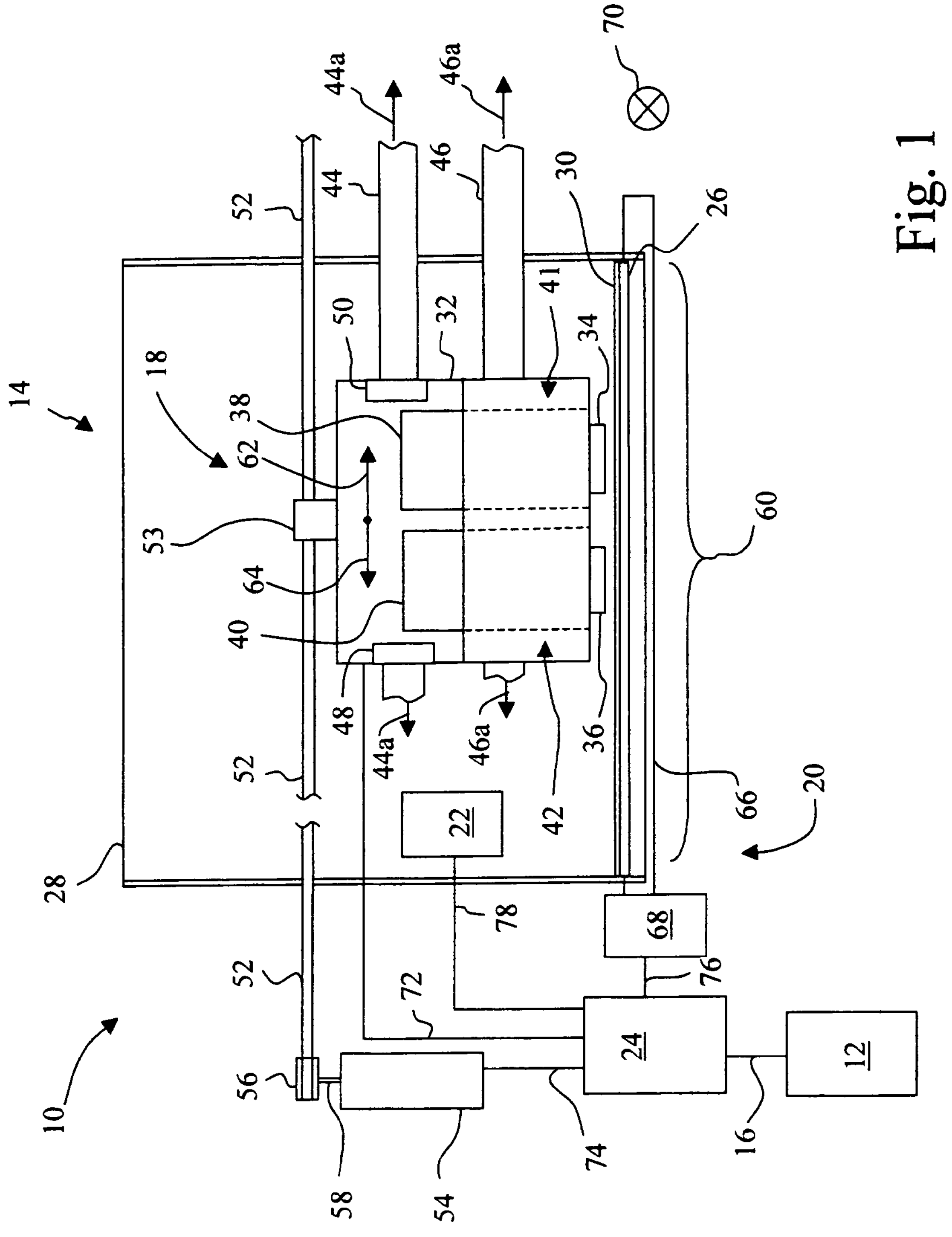
FIG. 1 is a diagrammatic representation of an imaging system embodying the present invention.

Referring now to the drawings, and particularly to FIG. 1, there is shown an imaging system 10 embodying the present invention. Imaging system 10 may include a host 12, or alternatively, imaging system may be a standalone system.

Imaging system 10 includes an imaging apparatus 14, which may be in the form of an ink jet printer 14 as shown. Thus, for example, ink jet printer 14 may be a conventional ink jet printer, or may form the print engine for a multi-function apparatus, such as for example, a standalone unit that has faxing and copying capability, in addition to printing.

Host 12, which may be optional, may be communicatively coupled to ink jet printer 14 via a communications link 16. Communications link 16 may be, for example, a direct electrical connection, a wireless connection, or a network connection.

In embodiments including host 12, host 12 may be, for example, a personal computer including a display device, an input device (e.g., keyboard), a processor, input/output (I/O) interfaces, memory, such as RAM, ROM, NVRAM, and a mass data storage device, such as a hard drive, CD-ROM and/or DVD units. During operation, host 12 includes in its memory a software program including program instructions that function as a printer driver for imaging apparatus 14. The printer driver is in communication with imaging apparatus 14 via communications link 16. The printer driver, for example, includes a halftoning unit and a data formatter that places print data and print commands in a format that can be recognized by imaging apparatus 14. In a network environment, communications between host 12 and imaging apparatus 14 may be facilitated via a standard communication protocol, such as the Network Printer Alliance Protocol (NPAP).

Ink jet printer 14 includes a printhead carrier system 18, a feed roller unit 20, a sheet picking unit 22, a controller 24, a mid-frame 26 and a media source 28.

Media source 28 is configured to receive a plurality of print media sheets from which a print medium, e.g., a print media sheet 30, is picked by sheet picking unit 22 and transported to feed roller unit 20, which in turn further transports print media sheet 30 during a printing operation. Print media sheet 30 can be, for example, plain paper, coated paper, photo paper and transparency media.

Printhead carrier system 18 includes a printhead carrier 32 for mounting and carrying a standard color printhead 34 and a photo printhead 36, or alternatively a monochrome printhead. A standard color ink reservoir 38 is provided in fluid communication with standard color printhead 34, and a photo ink reservoir 40, or alternatively a monochrome ink reservoir, is provided in fluid communication with photo printhead 36. Those skilled in the art will recognize that color printhead 34 and color ink reservoir 38 may be formed as individual discrete units, or may be combined as an integral unitary printhead cartridge. Likewise, photo printhead 36 and photo ink reservoir 40 may be formed as individual discrete units, or may be combined as an integral unitary printhead cartridge.

As shown in FIG. 1, printhead carrier 32 is guided by a guide rod 44 and a guide member 46. Each of guide rod 44 and guide member 46 includes a respective horizontal axis **44*a*, 46*a*. Printhead carrier 32 includes a pair of carrier bearings 48, 50, with each of carrier bearings 48, 50 including a respective aperture 49, 51 (see FIG. 2) for receiving guide rod 44. Printhead carrier 32 may further include a glide surface (not shown) that is retained in contact with guide member 46, for example, by gravitational force, or alternatively, by another guide rod bearing or bearing set. The horizontal axis 44*a* of guide rod 44, also sometimes referred to herein as X-axis 44*a*, generally defines a bi-directional scanning path for printhead carrier 32. Accordingly, the bi-directional scanning path is associated with each of printheads 34, 36**.

Printhead carrier 32 is connected to a carrier transport belt 52 via a carrier drive attachment device 53. Carrier transport belt 52 is driven by a carrier motor 54 via a carrier pulley 56. Carrier motor 54 has a rotating carrier motor shaft 58 that is attached to carrier pulley 56. At the directive of controller 24, printhead carrier 32 is transported in a reciprocating manner along guide rod 44 and guide member 46. Carrier motor 54 can be, for example, a direct current (DC) motor or a stepper motor.

The reciprocation of printhead carrier 32 transports ink jet printheads 34, 36 across the print media sheet 30, such as paper, along X-axis **44*a* to define a print zone 60 of ink jet printer 14. The reciprocation of printhead carrier 32 occurs in a main scan direction (bi-directional) that is parallel with X-axis 44*a*, and is also commonly referred to as the horizontal direction, including a left-to-right carrier scan direction 62 and a right-to-left carrier scan direction 64. Generally, during each scan of printhead carrier 32 while printing, the print media sheet 30 is held stationary by feed roller unit 20**.

Mid-frame 26 provides support for the print media sheet 30 when the print media sheet 30 is in print zone 60, and in part, defines a portion of a print media path of ink jet printer 14.

Feed roller unit 20 includes a feed roller 66 and corresponding index pinch rollers (not shown). Feed roller 66 is driven by a drive unit 68. The index pinch rollers apply a biasing force to hold the print media sheet 30 in contact with respective driven feed roller 66. Drive unit 68 includes a drive source, such as a stepper motor, and an associated drive mechanism, such as a gear train or belt/pulley arrangement. Feed roller unit 20 feeds the print media sheet 30 in a sheet feed direction 70, designated as an X in a circle to indicate that the sheet feed direction is out of the plane of FIG. 1 toward the reader. The sheet feed direction 70 is commonly referred to as the vertical direction, which is perpendicular to the horizontal bi-directional scanning path, and in turn, perpendicular to the horizontal carrier scan directions 62, 64. Thus, with respect to print media sheet 30, carrier reciprocation occurs in a horizontal direction and media advance occurs in a vertical direction, and the carrier reciprocation is generally perpendicular to the media advance.

Controller 24 includes a microprocessor having an associated random access memory (RAM) and read only memory (ROM). Controller 24 executes program instructions to effect the printing of an image on the print media sheet 30, such as for example, by selecting the index feed distance of print media sheet 30 along the print media path as conveyed by feed roller 66, controlling the reciprocation of printhead carrier 32, and controlling the operations of printheads 34, 36.

Controller 24 is electrically connected and communicatively coupled to printheads 34, 36 via a communications link 72, such as for example a printhead interface cable. Controller 24 is electrically connected and communicatively coupled to carrier motor 54 via a communications link 74, such as for example an interface cable. Controller 24 is electrically connected and communicatively coupled to drive unit 68 via a communications link 76, such as for example an interface cable. Controller 24 is electrically connected and communicatively coupled to sheet picking unit 22 via a communications link 78, such as for example an interface cable.

Figure 2:
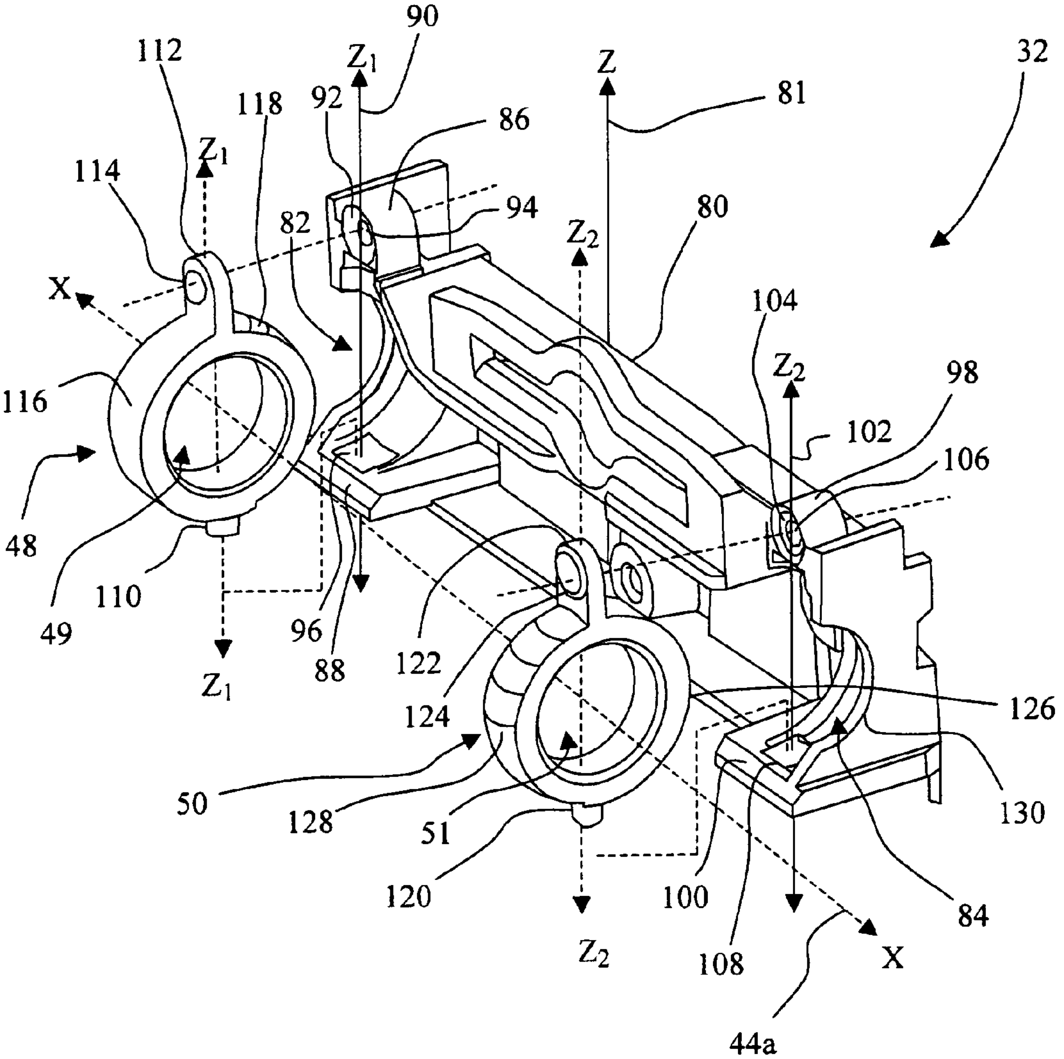
FIG. 2 is an exploded perspective view of the printhead carrier of FIG. 1.

Referring now to FIG. 2 in relation to FIG. 1, there is shown an embodiment of printhead carrier 32 with self aligning printhead carrier bearings 48, 50, in accordance with the present invention. Printhead carrier 32 is configured for movement along the horizontal axis, i.e., X-axis **44*a***.

Carrier bearings 48, 50 are arranged such that X-axis 44*a* passes through apertures 49, 51 of carrier bearings 48, 50, respectively, without intersecting carrier bearings 48, 50. In the embodiment of FIG. 2, printhead carrier 32 and carrier bearings 48, 50 are configured so that least one of one of carrier bearings 48, 50 is permitted to rotate relative to a Z-axis 81 of printhead carrier 32, thus self aligning carrier bearings 48, 50 with respect to printhead carrier 32 and the effective position of guide rod 44. Z-axis 81 is a vertical axis, which is substantially perpendicular to X-axis 44*a*, and passes through a central region of printhead carrier 32.

In actual practice, the alignment of carrier bearings 48, 50 with respect to printhead carrier 32 may be effected by using a high precision rod fixture that emulates guide rod 44 during the attachment of carrier bearings 48, 50 in printhead carrier 32. However, for convenience reference will be made to guide rod 44 and X-axis 44*a*.

Printhead carrier 32 includes a carrier housing 80 having a first bearing pocket 82 and a second bearing pocket 84. First bearing pocket 82 and second bearing pocket 84 are spaced apart along X-axis 44*a*.

First bearing pocket 82 includes an upper mounting feature 86 and a lower mounting feature 88. Upper mounting feature 86 and lower mounting feature 88 are spaced apart along the Z-axis of first bearing pocket 82, referred to herein as Z1-axis 90. As shown, Z1-axis 90 is substantially perpendicular to X-axis 44*a* and substantially parallel to Z-axis 81. Upper mounting feature 86 includes a concave region 92 that surrounds a screw hole 94. Lower mounting feature 88 includes an opening 96.

Second bearing pocket 84 includes an upper mounting feature 98 and a lower mounting feature 100. Upper mounting feature 98 and lower mounting feature 100 are spaced apart along a Z axis of second bearing pocket 84, referred to herein as Z2-axis 102. Z2-axis 102 is substantially perpendicular to X-axis 44*a* and substantially parallel to Z-axis 81 and Z1-axis 90. Upper mounting feature 98 includes a concave region 104 that surrounds a screw hole 106. Lower mounting feature 100 includes an opening 108.

Carrier bearing 48 is configured to be received in first bearing pocket 82. Carrier bearing 48 includes a locating pin 110 and a mounting post 112. Locating pin 110 is positioned for engagement with lower mounting feature 88, and more particularly, for being received in opening 96 of lower mounting feature 88. Mounting post 112 is positioned for engagement with upper mounting feature 86, and includes a screw hole 114 corresponding to screw hole 94 of upper mounting feature 86. Locating pin 110 and a mounting post 112 are diametrically opposed along Z 1-axis 90, with respect to X-axis 44*a*. The Z1-axis shown passing through carrier bearing 48 is shown in dashed lines to represent correspondence with Z1-axis 90 of first bearing pocket 82.

Z1-axis 90, which passes through locating pin 110 and mounting post 112 when carrier bearing 48 is installed in first bearing pocket 82, divides carrier bearing 48 into two halves: a first half that may include a flat outer surface 116, and a second half having a curved, or spherical, outer surface 118 that has a curve that extends, in length, in a direction of X-axis 44*a*. In other words, Z1-axis 90 delimits a first portion of carrier bearing 48, e.g., flat outer surface 116, from a second portion of carrier bearing 48, e.g., curved, or spherical, outer surface 118. In this embodiment, curved outer surface 118 is received in first bearing pocket 82.

Carrier bearing 50 is configured to be received in second bearing pocket 84. Carrier bearing 50 includes a locating pin 120 and a mounting post 122. Locating pin 120 is positioned for engagement with lower mounting feature 100, and more particularly, for being received in opening 108 of lower mounting feature 100. Mounting post 122 is positioned for engagement with upper mounting feature 98, and includes a screw hole 124 corresponding to screw hole 106 of upper mounting feature 98. Locating pin 120 and a mounting post 122 are diametrically opposed along Z2-axis 102, with respect to X-axis 44*a*. The Z2-axis shown passing through carrier bearing 50 is shown in dashed lines to represent correspondence with Z2-axis 102 of second bearing pocket 84.

Z2-axis 102, which passes through locating pin 120 and mounting post 122 when carrier bearing 50 is installed in second bearing pocket 84, divides carrier bearing 50 into two halves: a first half including a flat outer surface 126, and a second half that may have a curved, or spherical, outer surface 128 that has a curve that extends, in length, in a direction of X-axis 44*a*. In other words, Z2-axis 102 delimits a first portion of carrier bearing 50, e.g., flat outer surface 126, from a second portion of carrier bearing 50, e.g., curved, or spherical, outer surface 128.

In the embodiment shown in FIG. 2, flat outer surface 126 of carrier bearing 50, i.e., flat in the direction of X-axis 44*a*, is received in second bearing pocket 84 so as to lock carrier bearing 50 perpendicular with respect to a carrier datum, such as carrier datum 130, e.g., a sidewall of carrier housing 80.

In the embodiment shown in FIG. 2, it is to be recognized that advantageously, the configurations of carrier bearings 48 and 50 may be identical, so as to potentially reduce the bearing inventory necessary at a manufacturing site.

Figure 3A:
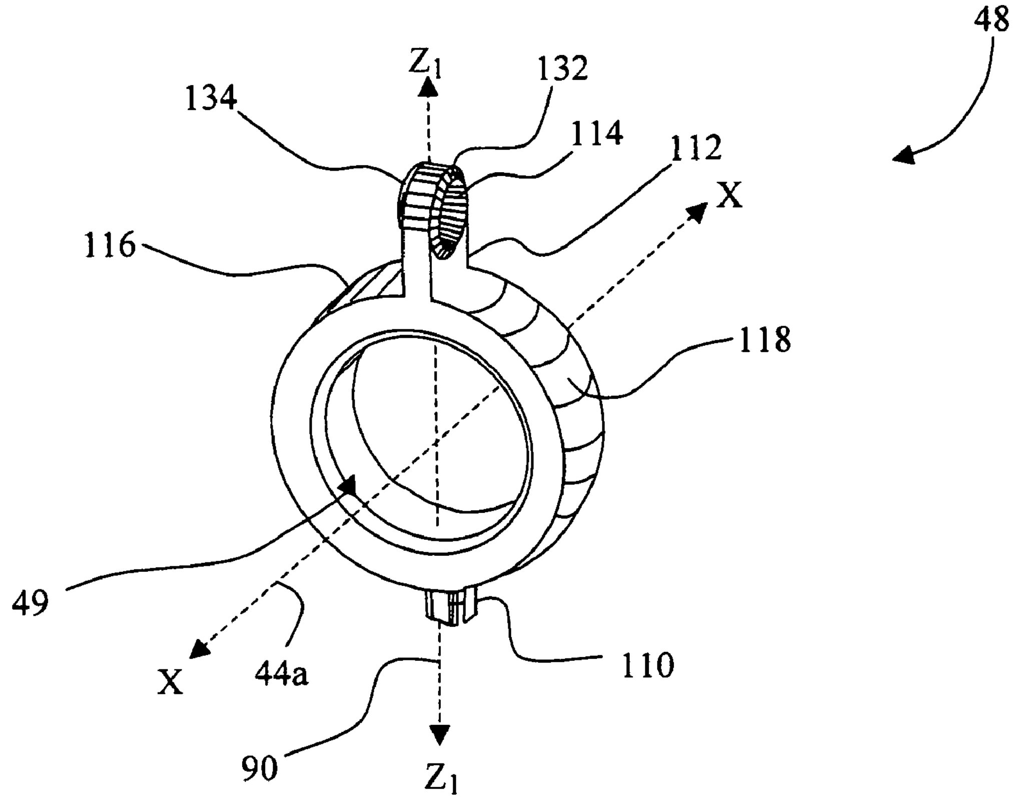
FIG. 3A is a perspective view of an exemplary carrier bearing configured in accordance with an embodiment of the present invention.
Figure 3B:
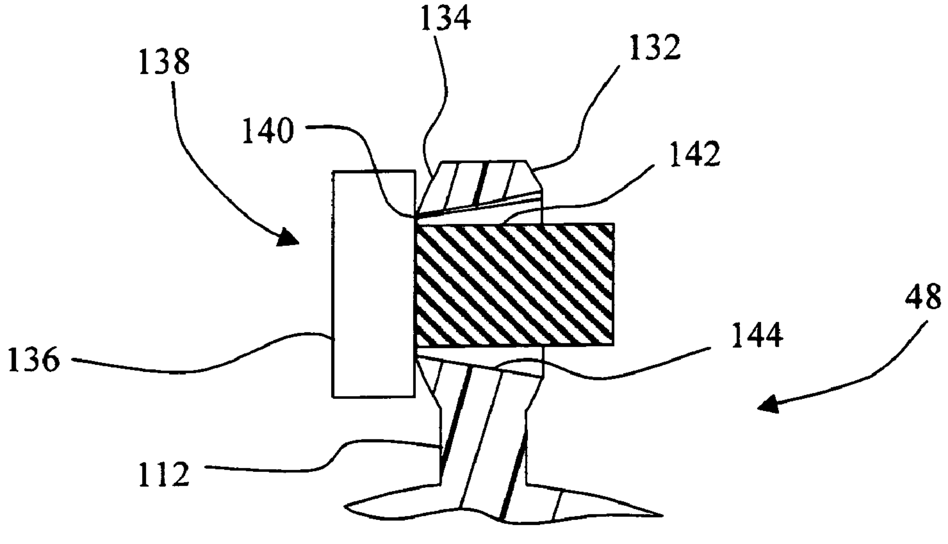
FIG. 3B is a sectioned portion of the mounting post of the carrier bearing of FIG. 3A.

FIG. 3A is a perspective view of carrier bearing 48, and FIG. 3B is a sectional view of mounting post 112 of carrier bearing 48. It is noted that carrier bearing 50 may be substantially identical in structure to carrier bearing 48, and thus, the description of carrier bearing 48 that follows may also be applied generally to carrier bearing 50. As mentioned above, Z1-axis 90, which passes through locating pin 110 and mounting post 112 when carrier bearing 48 is installed in first bearing pocket 82, divides carrier bearing 48 into two halves: a first half including a flat outer surface 116, and a second half having a curved, or spherical, outer surface 118 that curves in a direction of X-axis 44*a*. As shown in more detail in FIG. 3A, mounting post 112 includes a convex surface 132 for engaging concave region 92 of first bearing pocket 82. As can be best seen in FIG. 3B, mounting post 112 further includes a convex surface 134 for engaging a head 136 of a mounting screw 138 along a circular line of contact 140. Further, as shown in FIG. 3B, screw hole 94 is cone shaped to allow for rotation of carrier bearing 48 without shank 142 of mounting screw 138 contacting surface 144 of screw hole 94. Convex surfaces 132 and 134 surround screw hole 114.

Figure 4:
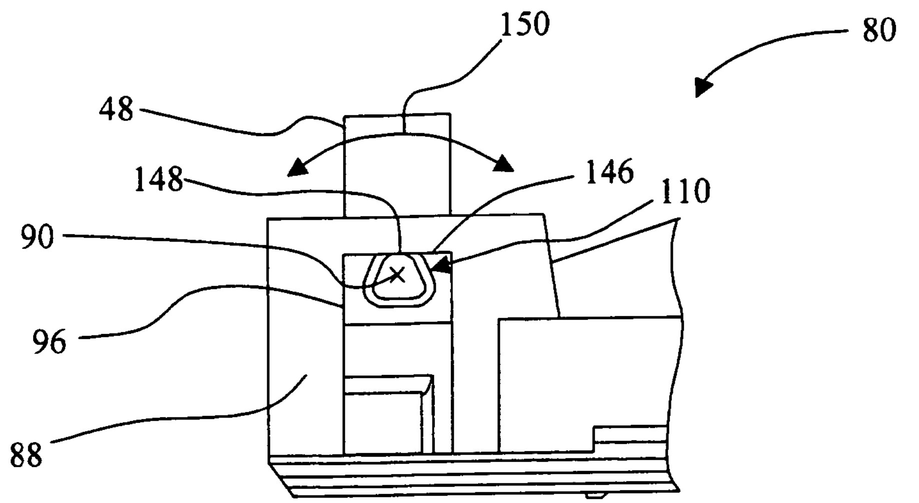
FIG. 4 is a bottom view of a lower mounting feature of the printhead carrier of FIG. 2.

FIG. 4 is a bottom view of a portion of carrier housing 80, and in particular, showing lower mounting feature 88. As shown, opening 96 of lower mounting feature 88 includes a flat surface 146. Locating pin 110 of carrier bearing 48 is shown having a V-shape as viewed along Z1-axis 90, and includes a radius 148 that engages flat surface 146 of lower mounting feature 88. Accordingly, until carrier bearing 48 is locked down by the tightening of mounting screw 138 (see FIG. 3B), carrier bearing 48 may rotate about Z1-axis 90, as indicated by direction arrows 150. Thus, referring again to FIGS. 1 and 2, carrier bearing 48 will be aligned with carrier bearing 50 in the presence of guide rod 44.

Figure 5:
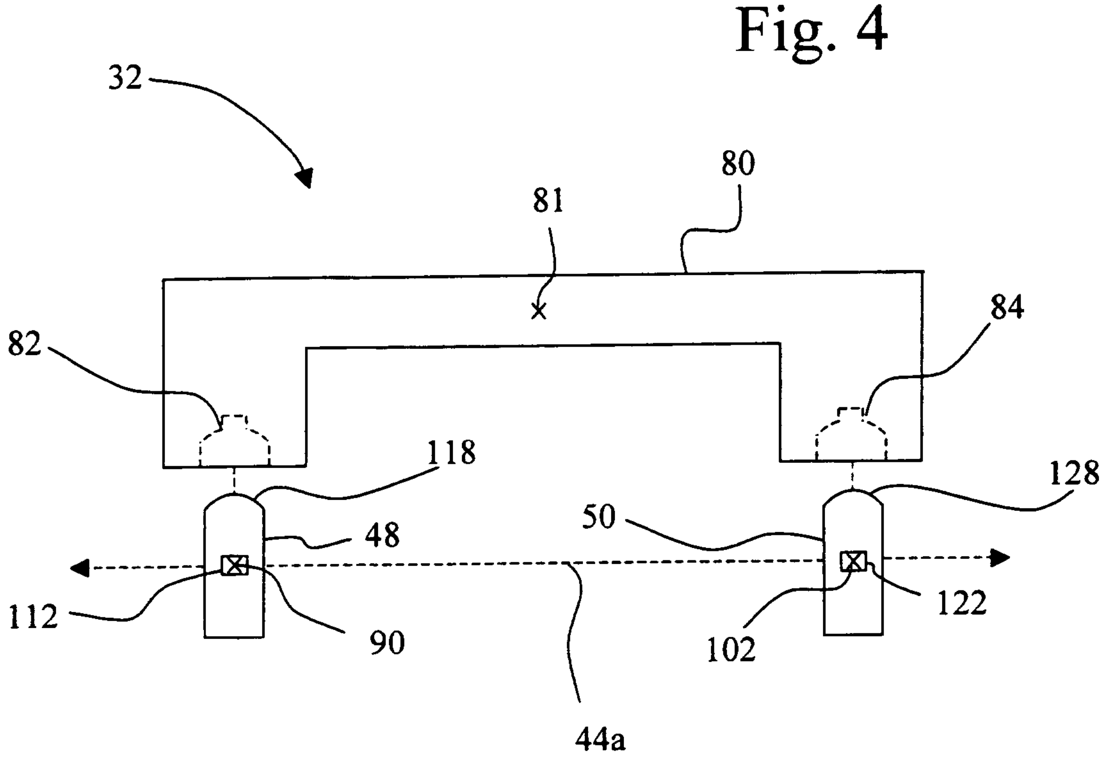
FIG. 5 is an exploded top diagrammatic representation of another embodiment of the present invention.

FIG. 5 is a diagrammatic top view of an alternative to the embodiment specifically shown in FIG. 2. In the embodiment of FIG. 5, each of carrier bearings 48 and 50 may be oriented such that their respective spherical (curved) outer surfaces 118, 128 are received in respective bearing pockets 82, 84. In this embodiment, the orientation of carrier bearing 50 is rotated 180 degrees about Z2-axis 102 with respect to the orientation of carrier bearing 50 shown in FIG. 2. This embodiment provides for additional freedom of movement in bearing alignment with respect to Z-axis 81 of carrier housing 80 and X-axis 44*a* associated with guide rod 44 by permitting individual rotation of carrier bearings 48, 50 along respective Z-axes 90, 102, and with respect to Z-axis 81 of carrier housing 80. In other words, unlike the embodiment of FIG. 2, in this embodiment neither of carrier bearings 48, 50 are initially located to a carrier datum, such as carrier datum 130. As such, it may be desirable to use a fixture to align carrier bearings 48, 50 with respect to X-axis 44*a* and Z-axis 81 of carrier housing 80 during installation of carrier bearings 48, 50 in carrier housing 80 of printhead carrier 32.

Figure 6A:
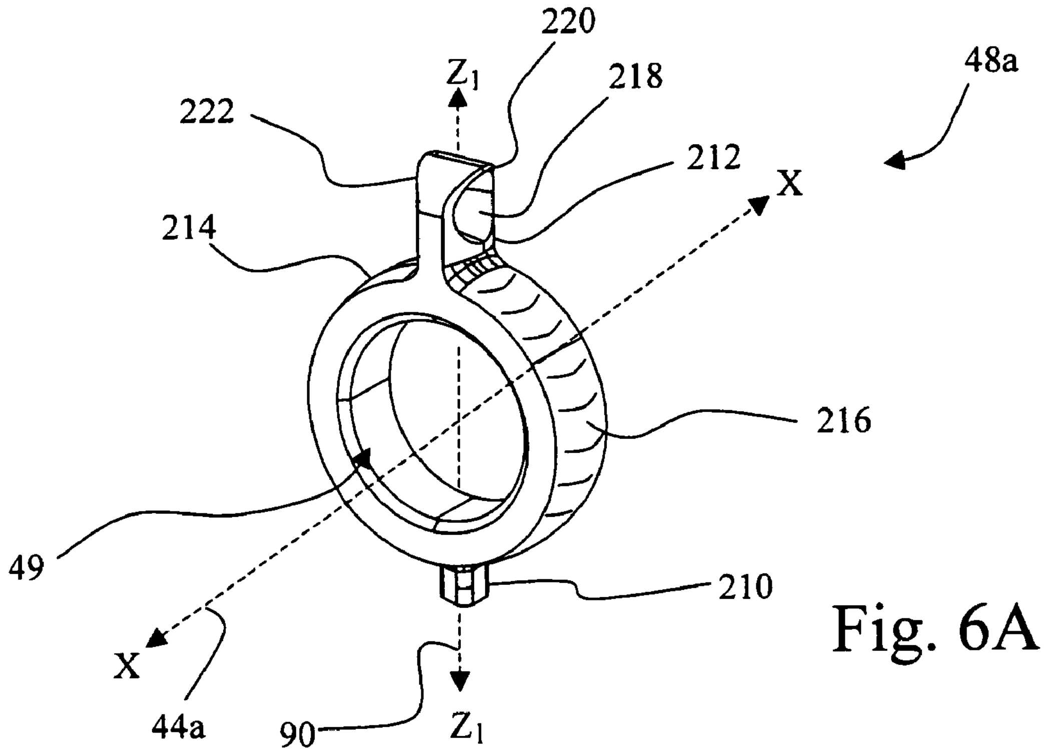
FIG. 6A is a perspective view of an exemplary carrier bearing configured in accordance with another embodiment of the present invention.
Figure 6B:
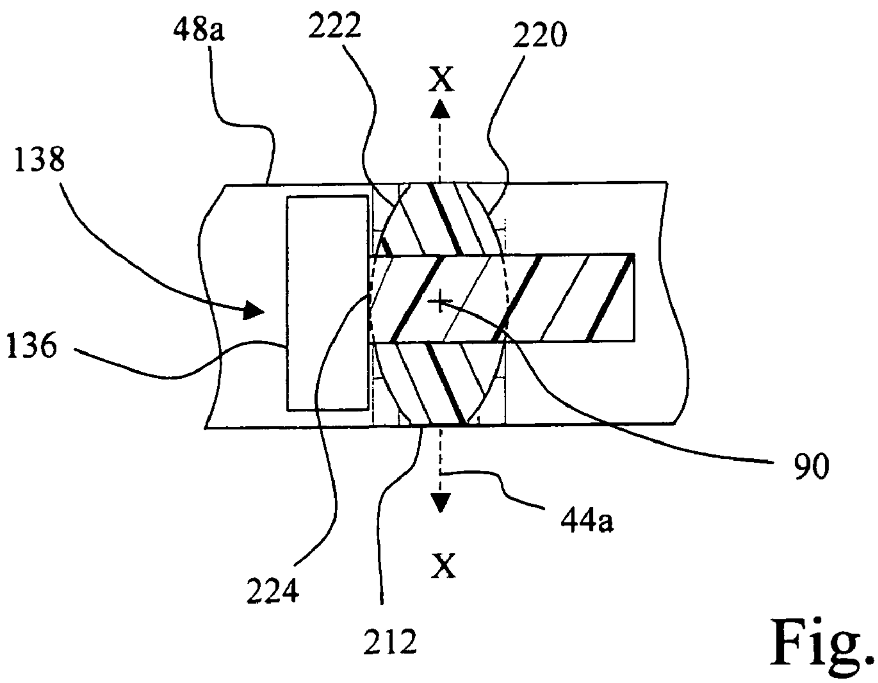
FIG. 6B is a sectioned top view of a portion of the mounting post of the carrier bearing of FIG. 6A.

FIG. 6A is a perspective view of another embodiment of carrier bearing 48, identified in FIGS. 6A and 6B as carrier bearing 48*a*. It is noted that carrier bearing 50 may be substantially identical in structure to carrier bearing 48*a*, and thus, the description of carrier bearing 48*a* that follows may also be applied generally to carrier bearing 50. FIG. 6B is a sectional top view of mounting post 212 of carrier bearing 48*a* viewed along axis Z1-axis 90. Z1-axis 90 passes through locating pin 210 and mounting post 212 when carrier bearing 48*a* is installed in first bearing pocket 82, and divides carrier bearing 48*a* into two halves: a first half including a flat outer surface 214, and a second half having a curved, or spherical, outer surface 216 that curves in a direction of X-axis 44*a*. As shown in FIGS. 6A and 6B, mounting post 212 includes a screw hole 218, a partial cylindrical surface 220 and a partial cylindrical surface 222. Partial cylindrical surface 220 is configured to engage concave region 92 of first bearing pocket 82. As can be best seen in FIG. 6B, partial cylindrical surface 222 is configured to engage head 136 of mounting screw 138 along a line of contact 224.

While this invention has been described with respect to embodiments of the present invention, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An imaging apparatus, comprising:

a guide rod extending along an X-axis; and a printhead carrier configured for movement along said X-axis, said printhead carrier including:

a carrier housing having a first bearing pocket and a second bearing pocket, said first bearing pocket and said second bearing pocket being spaced apart along said X-axis, wherein a Z-axis passes through a central region of said carrier housing, said Z-axis being substantially perpendicular to said X-axis;

a first bearing configured to be received in said first bearing pocket, said first bearing including a first curved outer surface having a curve that extends in a direction of said X-axis, said curved outer surface being received in said first bearing pocket to facilitate a rotation of said first bearing in relation to said Z-axis of said carrier housing; and a second bearing configured to be received in said second bearing pocket.

2. The imaging apparatus of claim 1, said second bearing including a second curved outer surface having a curve that extends in said direction of said X-axis, said curved outer surface being received in said second bearing pocket to facilitate a rotation of said second bearing in relation to said Z-axis of said carrier housing.

3. The imaging apparatus of claim 1, said first bearing pocket including a first upper mounting feature and a first lower mounting feature, said first upper mounting feature and said first lower mounting feature being spaced apart along a second Z- axis, said second Z-axis being substantially perpendicular to said X-axis.

4. The imaging apparatus of claim 3, said first bearing having a first locating pin for engagement with said first lower mounting feature and a first mounting post for engagement with said first upper mounting feature, said first locating pin and said first mounting post being diametrically opposed along said second Z-axis.

5. The imaging apparatus of claim 4, wherein said first mounting post includes a screw hole for receiving a mounting screw.

6. The imaging apparatus of claim 4, said second bearing pocket including a second upper mounting feature and a second lower mounting feature, said second upper mounting feature and said second lower mounting feature being spaced apart along a third Z-axis, said third Z-axis being substantially perpendicular to said X-axis and substantially parallel to said second Z-axis.

7. The imaging apparatus of claim 6, said second bearing having a second locating pin for engagement with said second lower mounting feature and a second mounting post for engagement with said second upper mounting feature, said second locating pin and said second mounting post being diametrically opposed along said third Z-axis, said second bearing having a flat outer surface that extends in a direction of said X-axis for engaging said second bearing pocket.

8. The imaging apparatus of claim 7, wherein said second mounting post includes a screw hole for receiving a mounting screw.

9. The imaging apparatus of claim 6, said second bearing having a second locating pin for engagement with said second lower mounting feature and a second mounting post for engagement with said second upper mounting feature, said second locating pin and said second mounting post being diametrically opposed along said third Z-axis, said second bearing having a curved outer surface having a curve that extends in a direction of said X-axis, said curved outer surface engaging said second bearing pocket.

10. The imaging apparatus of claim 9, wherein said second mounting post includes a screw hole for receiving a mounting screw.

11. An imaging apparatus, comprising:

a printhead carrier configured for movement along an X-axis, said printhead carrier including:

a carrier housing having a first bearing pocket, said first bearing pocket including a first upper mounting feature and a first lower mounting feature, said first upper mounting feature and said first lower mounting feature being spaced apart along a first Z-axis, said first Z-axis being substantially perpendicular to said X-axis; and a first bearing configured to be received in said first bearing pocket, said first bearing having a first locating pin for engagement with said first lower mounting feature and a first mounting post for engagement with said first upper mounting feature, said first locating pin and said first mounting post being diametrically opposed along said first Z-axis, said first bearing having a first curved outer surface having a curve that extends in a direction of said X-axis and that is received in said first bearing pocket.

12. The imaging apparatus of claim 11, said carrier housing having a second bearing pocket, said first bearing pocket and said second bearing pocket being spaced apart along said X-axis, said second bearing pocket including a second upper mounting feature and a second lower mounting feature, said second upper mounting feature and said second lower mounting feature being spaced apart along a second Z-axis, said second Z-axis being substantially perpendicular to said X-axis and substantially parallel to said first Z-axis.

13. The imaging apparatus of claim 12, further comprising a second bearing configured to be received in said second bearing pocket, said second bearing having a second locating pin for engagement with said second lower mounting feature and a second mounting post for engagement with said second upper mounting feature, said second locating pin and said second mounting post being diametrically opposed along said second Z-axis, said second bearing having a flat outer surface that extends in a direction of said X-axis and that is received in said second bearing pocket.

* * * * *